United States Patent [19]

Ikeda

[11] 4,401,206
[45] Aug. 30, 1983

[54] ARRANGEMENT FOR CONTINUOUSLY EXCAVATING GROUND AND CONVEYING EXCAVATED EARTH IN THE VERTICAL DIRECTION

[75] Inventor: Satoshi Ikeda, Tokyo, Japan

[73] Assignee: Shinko Kiko Co. Ltd., Tokyo, Japan

[21] Appl. No.: 250,717

[22] Filed: Apr. 3, 1981

Related U.S. Application Data

[62] Division of Ser. No. 132,117, Mar. 20, 1980, Pat. No. 4,306,364.

[30] Foreign Application Priority Data

Dec. 14, 1979 [JP] Japan ................... 54/162556

[51] Int. Cl.³ .............. B65G 17/36; B65G 47/18
[52] U.S. Cl. ................................ 198/549; 37/95; 198/703; 198/709; 198/812
[58] Field of Search ........... 198/543, 549, 567, 813, 198/709, 812, 703; 37/89, 90, 93, 95–97

[56] References Cited

U.S. PATENT DOCUMENTS 3,452,857  7/1969  Stambera ................ 198/703
3,684,079  8/1972  Kuehl .
4,303,363  12/1981  Cervin ................... 198/812 X

FOREIGN PATENT DOCUMENTS 942079  8/1965  Fed. Rep. of Germany .
766691  9/1958  United Kingdom .

Primary Examiner—Harold D. Whitehead
Assistant Examiner—Douglas D. Watts
Attorney, Agent, or Firm—Cushman, Darby & Cushman

[57] ABSTRACT

A continuous vertical the ground-excavating arrangement which comprises a guide post for being driven vertically into the ground deeper than the desired excavation depth so that said guide post can stand independently of excavation, a lower earth loading mechanism slidably secured to the guide post, a lower earth loading mechanisms, a vertical conveyor including an endless chain and conveying containers, and a horizontal earth discharging mechanism secured to the top end of the guide post. The lower earth loading mechanism includes means for securing cut ends of the endless chain for ease in adding chain links to the endless chain as the lower earth loading mechanism is periodically moved to lower excavating depths.

4 Claims, 6 Drawing Figures

ARRANGEMENT FOR CONTINUOUSLY EXCAVATING GROUND AND CONVEYING EXCAVATED EARTH IN THE VERTICAL DIRECTION

This is a division of application Ser. No. 132,117, filed Mar. 20, 1980, now U.S. Pat. No. 4,306,364.

BACKGROUND OF THE INVENTION

1. Field of the Invention

This invention relates to a method for continuously excavating the ground and continuously withdrawing the excavated earth to the ground surface in a vertical earth excavation and withdrawal work, particularly large-scale pit digging work, and an apparatus for practicing such a method.

2. Description of the Prior Art

Heretofore, bucket elevators have been prevalently used for vertically conveying dug-out earth to the ground surface in ground excavation work. In bucket elevators of this type a lower earth loading mechanism, a vertical conveying mechanism and an upper earth discharging mechanism are usually assembled into an integral structure with steel frames and other means, and the structure is installed at the site of excavation. In operation, the dug-out earth is first loaded onto the lower earth loading mechanism, then continuously conveyed up to the ground surface by a series of buckets mounted at given intervals on circulating endless chains and thence discharged out through the upper earth discharging mechanism. If the ground excavation is carried out horizontally along a fixed depth, as in the case of underground railway construction or sewage construction, the conventional vertical conveyor system can be used for continuous operation without remodeling said system, but if the ground is dug down to a great depth as in the case of foundation works for a massive building or structure, the vertical conveying mechanism must be extended by adding to the lower portion thereof according to the depth and also the lower earth loading mechanism must be lowered accordingly. Such an adding or extending operation has been generally practiced in the following way: the vertical conveying mechanism is temporarily hoisted up and the lower earth loading mechanism is removed and placed at a separate location, and after effecting the desired addition to the vertical conveying mechanism, the lower earth loading mechanism is re-mounted thereto. Such an adding operation, however, requires a great deal of labor and also necessitates interruption of the excavation work for a long time, resulting in a huge increase in construction cost.

SUMMARY OF THE INVENTION

The present invention has been devised in consideration of the defects in conventional excavation methods. According to this invention, the vertical conveying mechanism comprises a guide post which is driven into the ground deeper than the expected depth of excavation, so that there is no need of adding to the vertical conveying mechanism as in the conventional methods; also, since the lower earth loading mechanism is arranged to slide vertically along the vertical conveying mechanism which comprises said guide post, no demounting or re-mounting of said loading mechanism is required, and a desired extention of the conveying system can be attained by the mere addition of endless chains and the supplementary mounting of conveying containers. For effecting the addition of the endless chains, a chain holding mechanism is provided integrally on the support structure of the lower earth loading mechanism, so that such a chain adding operation can be accomplished easily and with safety. Thus, use of the method and apparatus according to this invention allows prosecution of the vertical earth excavating and conveying work at extremely high efficiency.

Thus, an object of this invention is to provide a method and an apparatus for excavating the ground and conveying the excavated earth in the vertical direction with a minimum number of steps and a short working time.

Another object of this invention is to provide a method of said type which can be practiced with safety and without requiring any specific skill, and an apparatus for this purpose which is simple in structure and easy to operate.

Still another object of this invention is to provide a method and an apparatus of said type which can extremely shorten the interruption time in the excavating and conveying work, allowing almost continuous performance the working steps.

Other objects and advantageous features of this invention will be easily understood from the following detailed description of the embodiments of this invention when taken in conjunction with the accompanying drawings.

BRIEF DESCRIPTION OF THE DRAWINGS

The invention is described in detail hereinbelow with reference to the accompanying drawings which illustrate a preferred embodiment of the invention. In the drawings:

FIG. 3b is a cross-sectional view of said securing mechanism as taken along the line X—X of FIG. 3a.

DETAILED DESCRIPTION OF PREFERRED EMBODIMENTS OF THE INVENTION

Figure 1:
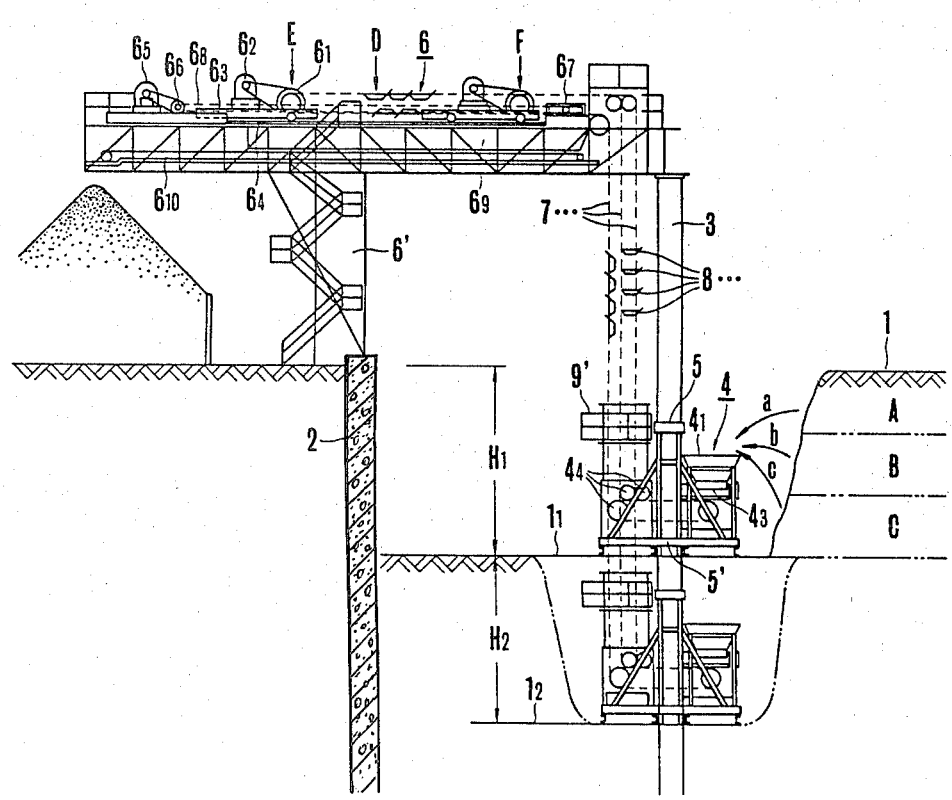
FIG. 1 is a side elevational view showing schematically the structural arrangement of the apparatus for carrying out the continuous vertical ground excavating and earth-conveying method according to this invention.
Figure 3A:
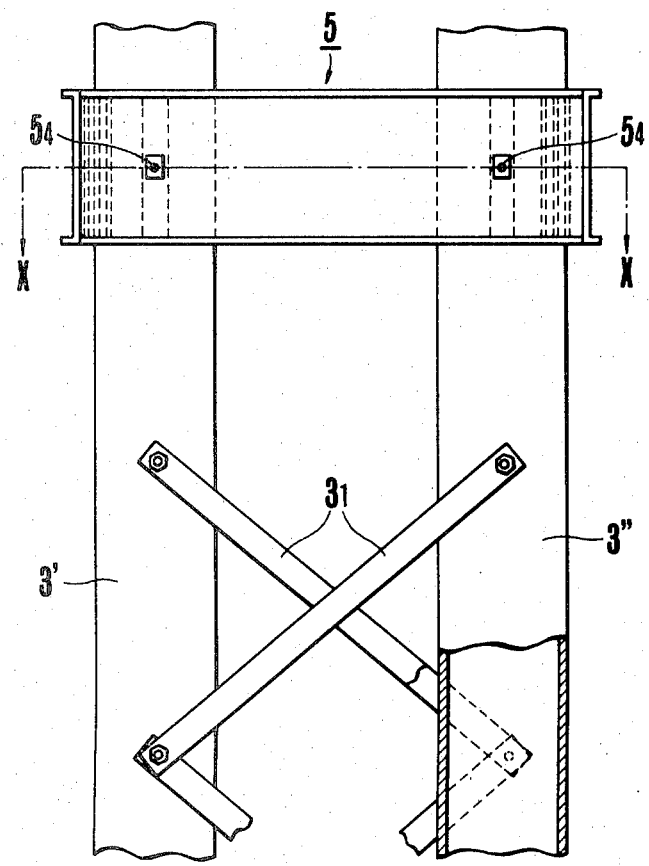
FIG. 3a is a side view showing a mode of mounting the slidable securing mechanism.
Figure 3B:
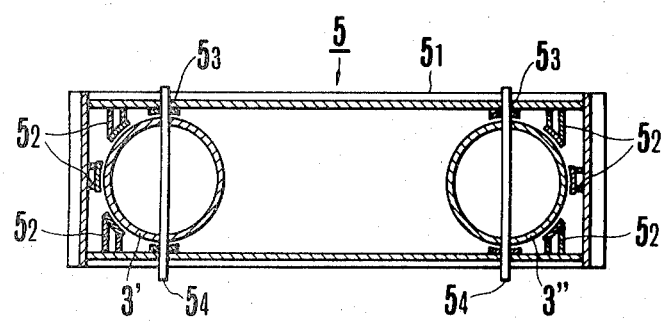

Referring first to FIG. 1 of the accompanying drawings, reference numeral 1 indicates the ground surface at the site of excavation. As the first step in the method of this invention, a cut-off wall 2 of a type conforming to the geological conditions of the site is built surrounding the site of excavation, said wall being substantially buried in the ground, so as to control spring water which springs out as the ground is dug down. At a position close to said cut-off wall 2, a guide post 3 is rammed down vertically such that the head portion thereof projects a suitable length above the ground surface. Said guide post 3 is driven into the ground deeper than the planned depth of excavation so that it can remain upright by itself when the excavation has reached the desired depth. In the embodiment shown, there are a pair of steel pipe piles 3', 3" provided with a plurality of bracings $3_1$ as shown in FIG. 3 so as to provide sufficient buckling strength as discussed later. Any suitable method may be employed for effecting the pile driving, but in order to avoid excessive driving, it is recommended that first a vertical hole be dug by an earth auger or like means, and then the guide post 3, or an assembly of said two steel pipe piles 3', 3" be inserted vertically into said hole.

A hole is excavated around the guide post 3 by using an ordinary excavator, to a depth $H_1$ at which the lower earth loading mechanism 4 is to be set. This depth $H_1$ may be suitably determined depending on the height of the hopper $4_1$ of the lower earth loading mechanism 4, on the type of the excavator used and other factors, but in the case of excavations carried out by this applicant, it was found that the most appropriate depth was about 8 m.

Then the lower earth loading mechanism 4, arranged to be guided vertically along the guide post 3, is set at the lever $1_1$ of the hole bottom at the depth $H_1$, and for this purpose, said earth loading mechanism 4 is slidably secured to the guide post 3 by using slidable securing mechanisms 5, 5'. Meanwhile, a support structure 6' is erected at the exposed peripheral portion of the previously built (buried) cut-off wall 2, and an upper earth discharging mechanism 6 is mounted horizontally such that it is supported by said support structure 6' and connected to the top end of the guide post 3. Then a conveying system, comprising a plurality of chains 7, a series of conveying container means (such as buckets) 8 and a plurality of chain wheels, is incorporated in the conveyor structure constituted by said lower earth loading mechanism 4, said guide post 3 and said upper earth discharging mechanism 6. Since the weight of the lower earth loading mechanism 4 is supported on the guide post 3 by the slidable securing means 5, 5', said loading mechanism can be properly set without specific foundation work even if the ground at the level of the hole bottom $1_1$ is soft and irregular. Thus, the ground surface soil A is excavated by using a suitable excavator, and the excavated soil is brought into the hopper $4_1$ as shown by arrow a. As the excavated level falls to B and then to C with the advancement of excavation, soil is put into the hopper $4_1$ in the direction of arrow b and then arrow c, and in this way is completed the excavation and earth-removing operation from the level $1_1$ reaching the surrounding cut-off wall 2.

The lower earth loading mechanism 4 is then raised up, in the manner described below, to a height sufficient to allow further excavation of the ground below; after securing said loading mechanism 4 to the guide post 3 by the slidable securing mechanisms 5, 5'. The ground beneath said loading mechanism 4 is excavated to a depth $H_2$ in the same way as the first hole ($H_1$) was excavated, and said loading mechanism 4 is set at this level $1_2$. The height of the temporary rise of the lower earth loading mechanism 4 and the depth $H_2$ of the second vertical hole may be suitably determined according to the type and performance of the excavator used, but according to the experience of this applicant, it was found appropriate to select 4 meters for the height of the temporary rise, and 6 meters for the depth $H_2$. The following embodiment of the invention is described on the basis of these figures.

The length of the chains to be extended out or drawn in, according to the vertical sliding movement of the lower earth loading mechanism 4 along the guide post 3, is adjusted by movement of a chain wheel $6_1$ provided at a terminal end of the upper earth discharging mechanism 6. The terminal chain wheel $6_1$, which is driven by a prime mover $6_2$ to circulate the series of chains 7, is mounted on a truck $6_3$ which is carried on rails $6_4$ laid on the top surface of the upper earth discharging mechanism 6. The truck $6_3$ is movable both to the right and to the left by a truck moving chain $6_8$ passed round a chain wheel $6_6$ arranged to be turned either forward or in reverse by a prime mover $6_5$ secured to the left end of the upper earth discharging mechanism 6, and the truck moving chain $6_8$ is mounted on another chain wheel $6_7$ secured to the right end of said mechanism 6. Said truck $6_3$ is positioned at substantially middle point D of the upper earth discharging mechanism 6 during normal conveying operation, but when the lower earth loading mechanism 4 rises up 4 meters from the initial set level, said truck $6_3$ moves accordingly to the position E which is 4 meters to the left of the position D; when said loading mechanism 4 lowers down 6 meters from the initial level, said truck $6_3$ now moves to the position F which is 6 meters to the right of the position D, thereby keeping a constant tension on the series of chains 7 to prevent the chains from being dislocated from their respective chain wheels. When the lower earth loading mechanism 4 is lowered down from the depth $H_1$ to $H_2$ and is set at the level $1_2$, said loading mechanism 4 is secured in position by the slidable securing mechanisms 5, 5' and additional chains 7 and supplementary earth-conveying container means 8 are provided for further excavation. In this operation, as further described below, the chains 7 are cut immediately above a chain holding mechanism 9, while the chains are held by said holding mechanism 9 at a scaffold 9' (for adding chains) disposed at a higher position than the supporting structure 4' of the lower earth loading mechanism. Then new chains, with a length of 6 meters corresponding to the depth of the ground to be further excavated, are joined to the upper portions of the respective cut chains 7. Then the truck $6_3$, at the position F at the right end of the upper earth discharging mechanism 6, is moved left 6 meters to the position E, whereby the joined chains are raised up and the lower ends thereof just coincide with the upper ends of the lower portions of the respective cut chains 7, so that they can be easily connected to each other. During this lifting of the chains, the additional earth-conveying containers 8 are mounted. In this way, preparation for the next ground-excavating and earth-withdrawing operation is completed, and the above-said process is repeated. The process is repeated cyclically as many times as necessary, performing ground excavation to a depth of $H_2$ each time, until the desired total depth is reached. Since the guide post 3 is driven into the ground deeper than the planned depth of excavation, it maintains its secure standing condition even if the ground therearound is excavated. After completion of the excavation work, the guide post is pulled out and the other mechanisms are removed, and then the next construction work is carried out.

Now, the structural arrangement of the equipment used for this continuous vertical excavation method is described.

Figure 2:
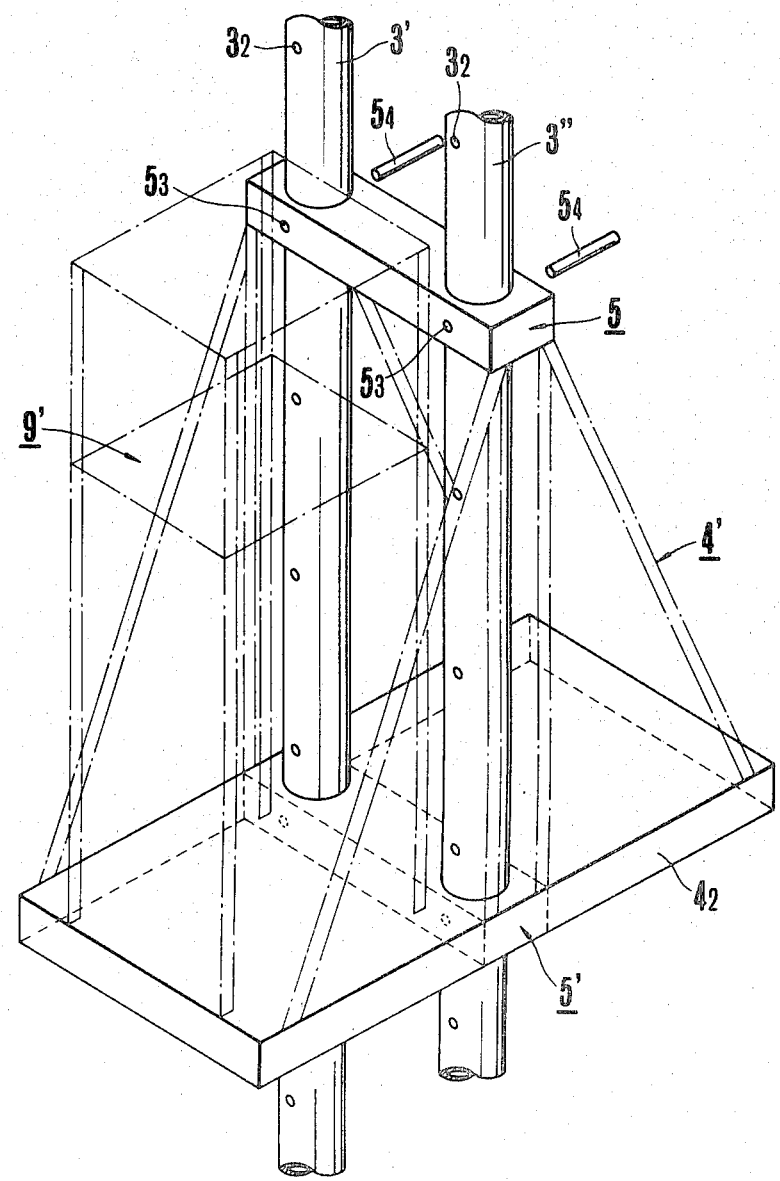
FIG. 2 is a perspective view showing schematically the construction of the support structure for the earth loading mechanism of the apparatus shown in FIG. 1.

FIG. 2 shows schematically the setup of the supporting structure 4' of the lower earth loading mechanism 4. The supporting structure 4' is a steel frame structure comprising an upper slidable securing mechanism 5 and a floor frame $4_2$ spaced vertically apart from each other and connected by diagonal and longitudinal members. Mounted on the floor frame $4_2$ are a hopper $4_1$, a screw feeder $4_3$ and a plurality of chain wheels $4_4$. Also, a lower slidable securing mechanism 5' is provided at the center the floor frame $4_2$. It will also be seen that a scaffold 9' for the addition of chains, which will be further described later, is provided at the upper part of the supporting structure 4'.

Both said slidable securing mechanisms 5, 5' are the same in structure. As shown in FIGS. 3$a$ and 3$b$, each said mechanism comprises a rectangular outer frame $5_1$ provided with a plurality of guide shoes $5_2$ so arranged as to slidingly attach to the outer peripheral surface of either of the steel pipe piles 3', 3" which constitute the guide post 3. In the side faces of said rectangular outer frame $5_1$ are formed holes $5_3$ corresponding to similar holes $3_2$ formed at regular intervals in the steel pipe piles 3', 3". The holes $5_3$ in the outer frame $5_1$ and the holes $3_2$ in the steel pipe piles 3', 3" are axially aligned with each other, and bolts $5_4$ are passed therethrough. Thus, the lower earth loading mechanism 4 can be secured to the steel pipe piles 3', 3" at a desired height.

In the embodiment shown, in order to provide with strength, the guide post 3 is constituted by said two parallel steel pipe piles 3', 3" which are secured to each other by a plurality of bracings $3_1$. As for the mode of adaption of said bracings $3_1$, they may be mounted crosswise with their ends being bolted by utilizing the holes $3_2$ in the steel pipe piles 3', 3", or other suitable fixing members may be used, but at any stage of working, the bracings at the location where the slidable securing mechanisms 5, 5' are secured to the steel pipe piles 3', 3" must be arranged so that they can be easily removed and easily remounted after properly moving the securing mechanisms 5, 5'. The configuration of the guide post 3 may be suitably changed in conformity with the design of the excavation work, and of course the configuration of the slidable securing mechanisms 5, 5' can be changed in correspondence with the changes of configuration of the guide post.

Vertical movement of the lower earth loading mechanism 4 along the guide post 3 may be effected by using a suitable hoisting machine such as a crane, but such movement can be accomplished more conveniently by adapting a simple hoisting means, such as chain blocks, by utilizing the holes $3_2$ formed in the upper part of the guide post 3. It is also possible to effect vertical movement of said lower earth loading mechanism 4 in a total-system-like manner by moving the truck $6_3$, which carries the upper earth discharging mechanism 6, by giving sufficient strength and driving force to said truck $6_3$ and its prime mover $6_2$ as well as to the chain wheels, chains and other associated means.

Figure 4:
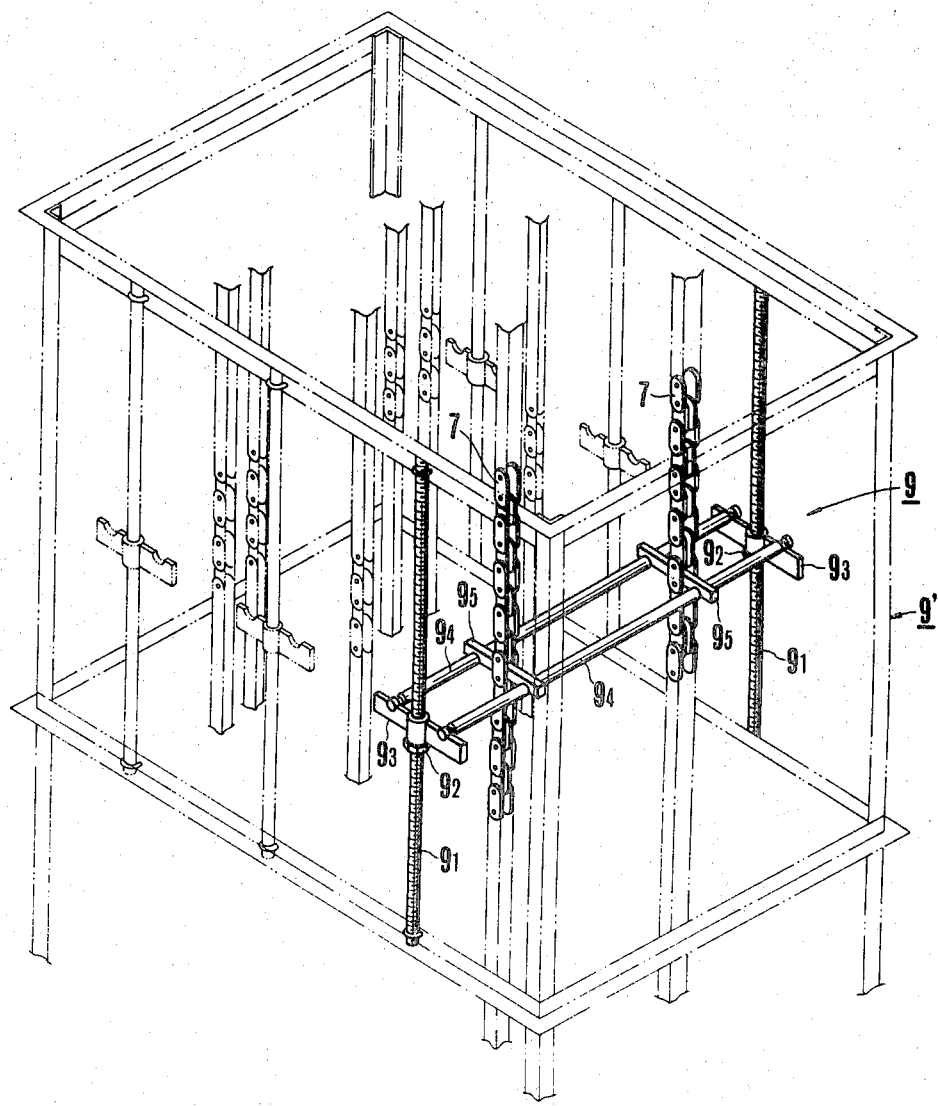
FIG. 4 is a perspective view showing schematically the structural arrangement of the chain holding mechanism.

The chain holding mechanism 9 in the apparatus of this invention will now be described with particular reference to FIG. 4. Said chain holding mechanism 9 is incorporated in the scaffold 9' (for chain addition) having a cubic steel frame structure constructed in such a way as to encompass a plurality of chains 7 which are on the support 4' of the lower earth loading mechanism 4. The holding mechanism 9 comprises a plurality of threaded poles $9_1$ disposed uprightly in opposition between the upper and lower steel frames, a pair of hangers $9_3$ supported by nuts $9_2$ engaged with said threaded poles $9_1$ so as to be vertically slidable along said respective threaded poles $9_1$, a pair of bearing rods $9_4$ passed across said pair of hangers $9_3$ and supported in half-circular recessions on the upper sides of said hangers, and locking bars $9_5$ passed across said pair of bearing rods $9_4$ and provided in equal numbers with the parallel chains 7. In the embodiment shown, are provided three assemblies of said chain holding mechanism corresponding to the three sets of vertical parallel chain groups. Cutting and adding of the chains 7 can be effected in the following way. First, the position of the hangers $9_3$ is adjusted by turning the nuts $9_2$, then each locking bar $9_5$ is passed through a space in each chain link as shown, and then the nuts $9_2$ are turned slightly upwardly, whereby the load of the chains positioned lower than the locking bars $9_5$ is supported by the chain holding mechanism 9, while the chain portions located immediately above the locking bars $9_5$ are greatly reduced in tension, allowing easy and safe removal of the chain pins. After completing the desired addition of the chains, the nuts $9_2$ are now turned downwardly, whereby the load applied on the locking bars $9_5$ is eliminated, allowing easy removal of said bars $9_5$.

Figure 5:
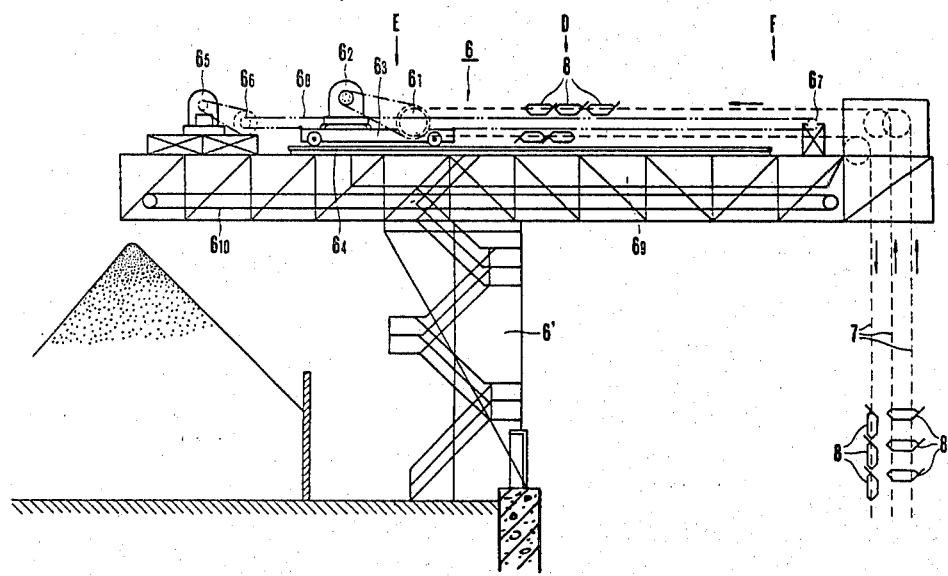
FIG. 5 is a side elevational view showing schematically the structural arrangement of the upper earth discharging mechanism.

The structure of the upper earth discharging mechanism 6 will now be described with reference to FIG. 5. Said discharging mechanism 6 is mounted horizontally, while supported by the head end of the guide post 3 and the supporting structure 6' erected at the peripheral portion of the cutoff wall 2. The earth containers 8 which have risen up vertically along the guide post 3 are turned to move in a horizontal direction at the right end of the discharging mechanism 6, then turned around the terminal chain wheel $6_1$ (which is driven by the prime mover $6_2$ to move the chains 7) to dump the earth and further advance on the return stroke. Said terminal chain wheel $6_1$ and said prime mover $6_2$ are mounted on a truck $6_3$ with wheel so that it can move sidewise on the rails $6_4$ laid on the top surface of the upper earth discharging mechanism 6. At both the front and rear ends of said truck $6_3$ is connected a chain $6_8$ for moving said truck $6_3$. Said chain $6_8$ is passed round a chain wheel $6_6$ which is driven forwardly or in reverse by a prime mover $6_5$ secured to the left end of the upper earth discharging mechanism 6, and by a chain wheel $6_7$ which is secured to the right end of said discharging mechanism 6. Thus, the truck $6_3$ is allowed to move either to the right or to the left on the rails $6_4$ with actuation of the prime mover $6_5$. As described above, the truck $6_3$ stays substantially at the central position D of the upper earth discharging mechanism 6 during the normal earth-conveying operation, but when the lower earth loading mechanism 4 is raised up for effecting excavation of the ground below said loading mechanism 4, said truck $6_3$ is accordingly moved to the left. When the lower earth loading mechanism 4 is lowered upon completion of excavation of the ground therebelow, said truck $6_3$ is now moved to its right end position. Also, when the chains are hoisted up and put under tension after completing the addition of the chains 7, the truck $6_3$ is again moved to the left to its original position D. Below the earth discharging mechanism 6 are also provided a chute $6_9$ and a belt conveyor $6_{10}$ extending horizontally along the return path of the earth containers 8, thereby associating movement of the excavated earth dumping ground and also to receive the mud which remains on the containers and drops during their movement on the return stroke, this received mud being carried to the earth dumping ground.

As described above, the continuous ground-excavating and earth-conveying method and apparatus according to this invention are quite different from the conventional method and apparatus in which, upon excavation of the ground through a given depth, it is necessary to remove the lower earth loading mechanism, to add and extend the lower portion of the vertical earth conveying mechanism, and to re-assemble the respective mechanisms for performing the next excavating operation. According to the method and apparatus of this invention, first a guide post is driven into the ground deeper than the planned depth of excavation, said guide post being utilized as a part of the earth-conveying mechanism, and the excavation of the ground below the lower earth loading mechanism and the lowering of this mechanism with the advance of the excavation work can be accomplished without requiring any troublesome work, such as removal of the earth loading mechanism, but by merely sliding said mechanism vertically along the guide post. Also, addition of the chains can be effected easily, securely and safely by using a chain holding mechanism provided on the supporting structure of the lower earth loading mechanism. Further, extension or shortening of the chain length as required in accordance with vertical movement of the lower earth loading mechanism, or addition of chains, can be adjusted by merely changing the position of the truck which is moved through the medium of a chain wheel provided at one end of the upper earth discharging mechanism. It is thus possible to carry out the whole excavation process continuously and efficiently, affording a sizable reduction in work time and construction cost. This invention therefore can provide a vast improvement in large-scale vertical excavation work.

What is claimed is:

1. An apparatus for excavating a portion of ground, comprising:

guide post means for being driven vertically into the earth deeper than a predetermined depth to be excavated;

a lower earth loading mechanism for receiving earth removed from the portion of ground being excavated;

means for slidably securing said lower earth loading mechanism to said guide post means so that said loading mechanism can be placed at any vertical height along said guide post means down to a current level of excavation;

means for vertically conveying earth previously deposited in said lower earth loading mechanism said vertical conveying means including
   an endless chain;
   a plurality of chain wheels including a horizontally movable chain wheel substantially at an upper portion of said vertical conveying means said horizontally movable chain wheel permitting the extension or drawing in of said endless chain;
   a plurality of containers carried by said chains;

an upper earth discharging mechanism, disposed substantially horizontal to said guide post means and to said vertical conveying means for horizontally conveying earth, vertically conveyed by said vertical conveying means, to a predetermined dumping place; and means, coupled to said lower earth loading mechanism, for holding lower portions of said chain after it has been cut in preparation for adding chain links thereto to extend the length of said chain when said lower earth loading mechanism is to be lowered along said guide post means to a new excavating depth.

2. An apparatus according to claim 1, wherein said horizontally movable chain wheel is provided at a terminal end of said upper earth discharging mechanism and is driven by a prime mover to circulate said conveying means, said particular chain wheel being also movable horizontally on said upper horizontal earth discharging mechanism for extending or drawing in the endless chains.

3. An apparatus according to claim 1, wherein said horizontally movable chain wheel is disposed on a truck with wheels, and the position of said truck is adjustable by a driving means, preferably a chain type driving means, provided at a terminal end of the upper earth discharging mechanism.

4. An apparatus according to claim 1, wherein said holding means comprises a plurality of paired threaded poles disposed upright squarely on a supporting structure of said lower earth loading mechanism, nut means engaged with said threaded poles, hangers slidably supported on said nut means, paired bearing rods passed across said hangers with the associated endless chain ends being placed therebetween, and locking bars each of which is passed through a space in an associated endless chain link and which extends across said bearing rods.

* * * * *